United States Patent

[11] 3,568,923

| [72] | Inventor | Loyal H. Chapman<br>1801 Flag Ave. S., Minneapolis, Minn. 55426 |
|------|----------|---|
| [21] | Appl. No. | 811,405 |
| [22] | Filed | Mar. 28, 1969 |
| [45] | Patented | Mar. 9, 1971 |

[54] AERONAUTICAL COMPUTER
2 Claims, 9 Drawing Figs.

[52] U.S. Cl............................................. 235/70,
33/107, 235/79.5
[51] Int. Cl............................................. G06g 1/02
[50] Field of Search........................................ 235/79.5,
70.8; 33/107, 111, 161; 235/64, 87, 70

[56] References Cited
UNITED STATES PATENTS
575,671   1/1897   Watts et al..................... 33/107

| 2,117,335 | 5/1938 | Koch............................ | 33/107X |
| 2,158,431 | 5/1939 | Sanders........................ | 235/87 |
| 2,382,064 | 8/1945 | Judd............................. | 235/70 |
| 2,403,382 | 7/1942 | Lerner.......................... | 235/70 |
| 2,526,408 | 10/1950 | Posson........................ | 235/79.5 |

FOREIGN PATENTS

| 612,218 | 7/1926 | France......................... | 235/70 |
| 1,112,271 | 11/1955 | France......................... | 235/87 |
| 221,635 | 2/1943 | Switzerland.................. | 235/70 |

Primary Examiner—Richard B. Wilkinson
Assistant Examiner—Stanley A. Wal
Attorney—Wayne Easton ABSTRACT: An aeronautical computer which combines a writing instrument with measuring scales used for measuring distances on aeronautical maps and log scales used for making various speed and fuel calculations.

PATENTED MAR 9 1971 3,568,923
SHEET 1 OF 2
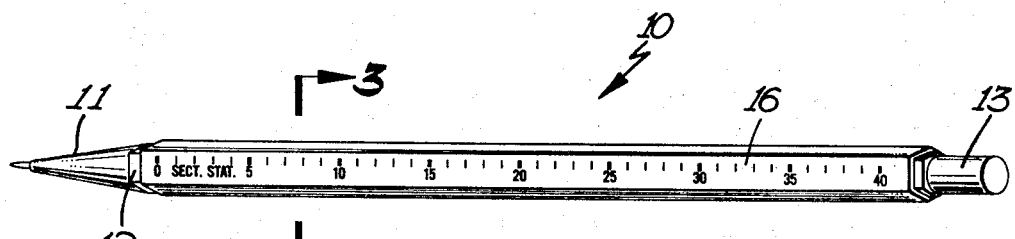
FIG 1
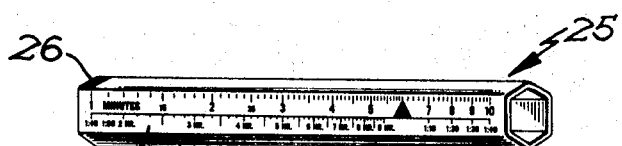
FIG 2
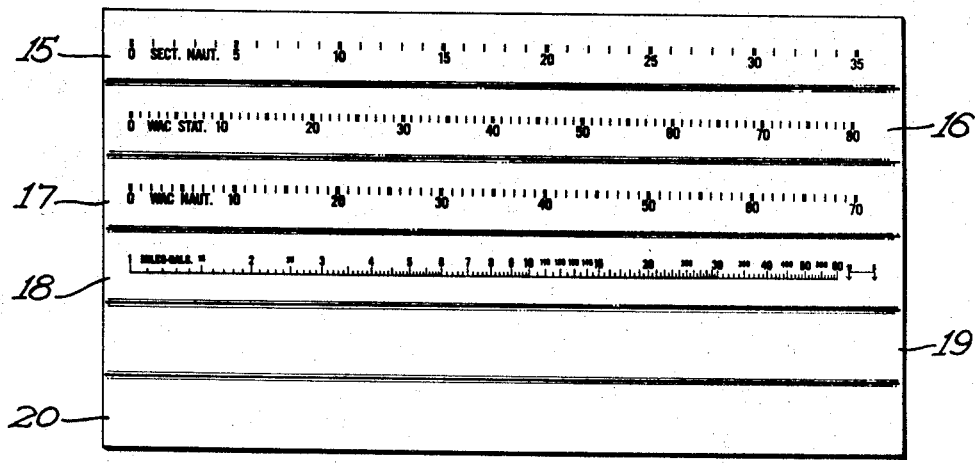
FIG 4
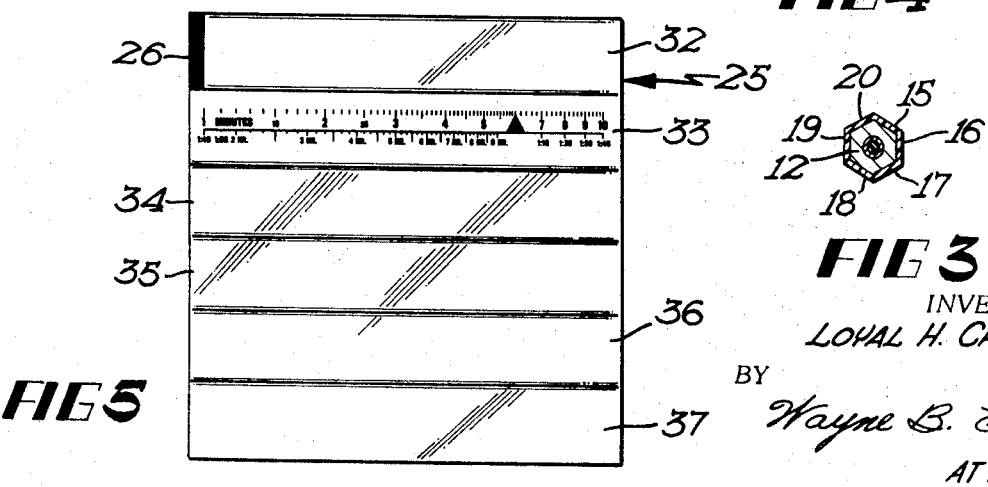
FIG 5
FIG 3
INVENTOR.
LOYAL H. CHAPMAN
BY Wayne B. Easton
ATTORNEY INVENTOR.
LOYAL H. CHAPMAN
BY Wayne B. Easton
ATTORNEY

AERONAUTICAL COMPUTER

The invention relates to a new and improved aeronautical computer which combines a writing instrument with various scales used in making aeronautical map measurements and in making various speed and fuel calculations.

A computer having the above referred to features or functions enables a pilot in flight to very conveniently make necessary and essential flight calculations while also manning the controls of the airplane. A primary object of the invention is to provide a multipurpose computer which will contribute to the safe handling of an airplane by reducing the number of articles the pilot must handle in making his calculations. Each additional article a pilot has to handle in making his calculations lessens his capability for safely controlling the airplane. Thus any aid which can be given to a pilot to ease the burdens and complexities of his calculations will allow him to direct more of his attention to his flight controls and produce a safer flying operation.

A main object of the invention is to provide a new and improved aeronautical computer capable of a number of functions which simplifies a pilot's duties in making calculations during the time he is also engaged in the piloting of the aircraft.

Other objects and advantages of the invention will become apparent from the following specification, drawings and appended claims.

FIGS. 1 and 2 are perspective views respectively of a writing instrument and a sleeve member therefor which are the parts for an aeronautical computer which constitutes a first embodiment of the invention;

FIG. 3 is a sectional view taken on line 3—3 of FIG. 1;

FIGS. 4 and 5 are planar representations, respectively, of the hexagonal configurations of the computer parts shown in FIGS. 1 and 2;

Figure 6:
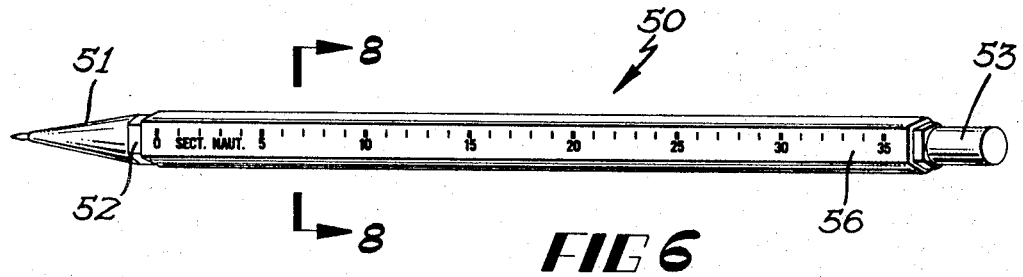
FIGS. 6 and 7 are perspective views respectively of a writing instrument and a slotted sleeve member therefor which are parts of an aeronautical computer which constitutes a second embodiment of the invention.

FIGS. 1 to 5 of the drawing show an aeronautical computer which constitutes a first embodiment of the invention. In FIG. 1 there is shown a writing instrument 10 which is illustrated by way of example as being an automatic pencil having a lead holding fitting 11 at one end thereof, a middle barrel portion 12 and a lead feed ferrule 13 at the opposite end thereof.

Although barrel portion 12 is illustrated as having a hexagonal configuration with longitudinally extending sides 15 to 20, it may be viewed in a broad sense within the scope of the invention as being generally cylindrical. The hexagonal sides 15 to 20 facilitate indexing of the sleeve shown in FIG. 2 but in the absence of hexagonal sides other suitable indexing means could be provided.

FIG. 4 is a planar representation of the six hexagonal sides 15 to 20 and one or more distance scales are provided on the six hexagonal sides. As illustrated, three distance scales of different or varying magnitudes are provided respectively on the sides 15, 16 and 17. These distance scales match the distance scales of sectional and regional aeronautical maps.

One of the hexagonal sides of the pencil, such as the side 18, has a two-cycle log scale imprinted thereon which is labeled as "MILES" and "GALS." scale.

In FIG. 2 there is shown a transparent hexagonal sleeve 25 having a side 33 upon which are imprinted two single cycle log scales which match the two cycle log scale on side 18 of the pencil. FIG. 5 is a planar representation of the six hexagonal sides 32 to 37 of the sleeve 25. The scales on side 33 thereof are minute and hour scales, respectively.

The sleeve 25 slips onto the pencil barrel 12 and is indexed relative thereto so that the log scales on the side 33 thereof overlay the lower part of panel 18 of the pencil barrel 12 and are thereby beneath and in mating relation to the two cycle log scale on the pencil side 18.

Sleeve 25 has a length which is approximately equal to one-half the length of the two cycle log scale on panel 18. Sleeve 25 is also of a length so that when it is used in making computations it does not extend beyond either end of writing instrument 10.

ONe use for the computer shown in FIGS. 1 to 5 is in calculating ground speed. A pilot in flight utilizes a selected one of the scales 15, 16 or 17 to determine, with a measurement, the distance between two points on an aeronautical map. Sleeve 25 has a measuring marker 26 at the left end of panel 32 thereof and when one of the scales, such as the scale 17, is laid on the map, the "O" on panel 17 is made to register with one point on the map and the sleeve 25 is moved relative thereto until the marker 26 thereon registers with the other point on the map. The distance can then be read directly from the scale of the panel 17. On the other hand, if the map scale is different from any of the scales on panels 15 to 17, the marker 26 can be used to measure the absolute distance between two points on the map and then the instrument is moved to the given scale at the side or bottom of the map for a deduced determination of the measured distance between the two points on the map.

It may be assumed way of example that scale 17 is used and that the distance measured therewith with the marker 26 is 90 miles. If the pilot finds from his watch that 45 minutes has elapsed in traveling the distance between the two points he will set 45 of scale 33 under 90 of scale 18 and read 120 on scale 18 above the 6 on scale 33. This means that his average ground speed between the two points on the map would have been 120 miles per hour. It will be understood that the 6 on scale 33 represents 60 minutes or an hour.

If the pilot's fuel gauge indicates that 7½ gallons of fuel were used during those 45 minutes he will use the scales 18 and 33 to divide 7½' by 45 and read on scale 18 above the 6 on scale 33 that he is using fuel at the rate of 10 gallons per hour.

In making the calculations for the two examples referred to above the pilot will use the writing instrument to record intermediate and final readings on paper. A great convenience is thus provided by having a single instrument for performing the writing map measuring and calculating operations in that, in addition to the manual diversion required in operating the control of the airplane, the pilot also has to hold the map and the pad of paper in close proximity to him. Thus the additional hand movements required to alternately pick up and put down a ruler for for map measurements, a pencil and a calculator, such as a slide rule or an aeronautical circular type computer, have been eliminated. This convenience is gratefully welcomed by the pilot because it simplifies his duties which are very complex at those times when flight calculations are being made and provides a greater factor of safety for both himself and his passengers.

FIGS. 6 to 9 of the drawing show an aeronautical computer which constitutes, along with an identical sleeve member as shown in FIGS. 2 and 5, a second embodiment of the invention. In FIG. 6 there is shown a writing instrument 50 which is illustrated by way of example as being an automatic pencil having a lead holding fitting 51 at one end thereof, a middle barrel portion 52 and a lead feed ferrule 53 at the opposite end thereof.

Although barrel portion 52 is illustrated as having a hexagonal configuration with longitudinally extending sides 55 to 60, it may be viewed in a broad sense within the scope of the invention as being generally cylindrical. The hexagonal sides 55 to 60 facilitate indexing of the sleeve shown in FIG. 7 but in the absence of hexagonal sides other suitable indexing means could be provided.

Although one or more distance scales may be provided on the six hexagonal sides 55 to 60 of the barrel 52, only one distance scale is illustrated and this is imprinted on the hexagonal side 56. The distance scale on side 56 matches a scale on a sectional or regional aeronautical map.

Figure 7:
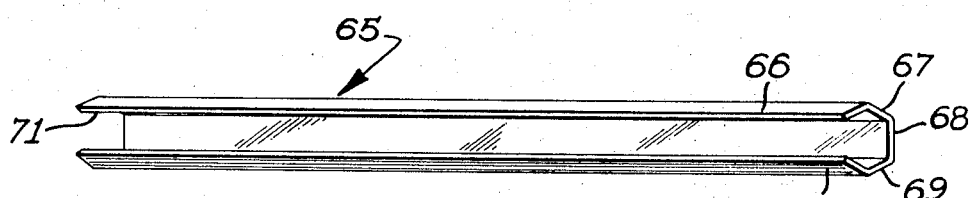

In FIG. 7 there is shown an opaque, hexagonal sleeve 65 which is longitudinally slotted so that the sleeve has five sides 66 to 70 instead of six. The resulting slot 71 extends longitudinally. As an alternative, however, the sixth side of the hexagonal configuration could be a window made of a transparent material instead of a slot.

Figure 9:
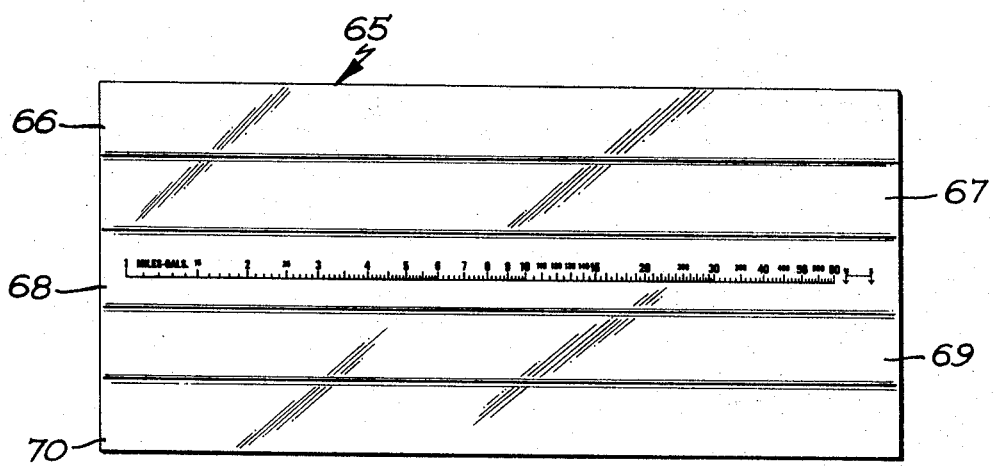
FIG. 9 is a planar representation of the computer sleeve member.
Figure 8:
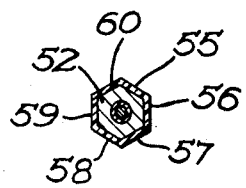
FIG. 8 is a sectional view taken on line 8—8 of FIG. 6.

FIG. 9 is a planar representation of the five sides 66 to 70 of sleeve 65. The sleeve 65 slips onto the pencil barrel 52 and is indexed relative thereto so that the distance scale on the pencil side 56 shows through the window or slot 71 of sleeve 65.

Sleeve 65 has a two cycle log scale imprinted on side 68 thereof which may be, and is illustrated as being, identical to the log scale imprinted on the side 18 of pencil 10, as shown in FIG. 4.

A second sleeve slips over sleeve 65 and, as this second sleeve may be identical to the sleeve 25 shown in FIGS. 2 and 5, a separate illustration of it is not deemed to be required. The transparent sleeve 25 slips over the sleeve 65 and is indexed relative thereto so that the log scales on the side 33 thereof overlay the lower part of panel 68 on the sleeve 65 and are thereby beneath and in mating relation to the two cycle log scale on the sleeve 65.

The use of the computer shown in FIGS. 6 to 9, including the sleeve shown in FIGS. 2 and 5, is analogous to the use of the computer shown in FIGS. 1 to 5 and thus does not require a separate explanation. An advantageous feature of the second computer, however, is that the window or slot 71 of the sleeve 65 thereof only exposes one distance scale on the pencil 50 at a time and thus minimizes the possibility of confusion which might result if more than one distance scale were visible to the pilot.

It will be understood that both computers described above could have additional scales within the scope of the invention. For example, matching temperature and altitude scales could be added which relate to and function with the described scales to provide a true air speed reading and a true altitude reading. Also scales could be added for converting Centigrade to Fahrenheit, and vice versa, relative to temperature readings.

I claim:

1. An aeronautical computer comprising an elongated writing instrument having a generally cylindrical longitudinally extending surface of a predetermined length, at least one longitudinally extending distance scale on said surface, a longitudinally extending two cycle log scale on said surface in parallel relation to said distance scale, a transparent sleeve slidably disposed on and in surrounding relation to said cylindrical surface, said sleeve having a length equal to approximately half said predetermined length said sleeve having a longitudinally extending single cycle log scale matching said two cycle log scale and being cooperable therewith, said sleeve having a length which is only sufficient to accommodate said single cycle log scale so that in the use of said log scales said sleeve does not extend beyond the ends of said writing instrument, and said sleeve having a marker at one end thereof for cooperation with said distance scale for scaling distances on aeronautical maps.

2. An aeronautical computer according to claim 1 wherein said generally cylindrical surface is hexagonal and said sleeve has a hexagonally shaped cross section.